US006534184B2

(12) United States Patent
Knasiak et al.

(10) Patent No.: US 6,534,184 B2
(45) Date of Patent: Mar. 18, 2003

(54) POLYSILAZANE/POLYSILOXANE BLOCK COPOLYMERS

(75) Inventors: Gary J. Knasiak, Columbus, OH (US); Alexander Lukacs, III, Wayne, PA (US); Robert W. Mouk, Westerville, OH (US); Albert E. Abel, Powell, OH (US)

(73) Assignee: Kion Corporation, Huntingdon Valley, PA (US)

( * ) Notice: Subject to any disclaimer, the term of this patent is extended or adjusted under 35 U.S.C. 154(b) by 54 days.

(21) Appl. No.: 09/793,224

(22) Filed: Feb. 26, 2001

(65) Prior Publication Data

US 2002/0165319 A1 Nov. 7, 2002

(51) Int. Cl.$^7$ .................. B32B 25/20; C08G 77/452; C08G 77/54

(52) U.S. Cl. .................. 428/447; 525/477; 528/28; 528/33; 528/36; 528/38

(58) Field of Search .............. 528/28, 33, 38, 528/36; 525/477; 428/447

(56) References Cited

U.S. PATENT DOCUMENTS

| 3,911,169 | A | * | 10/1975 | Lesaicherre et al. | ......... 427/240 |
|---|---|---|---|---|---|
| 4,482,669 | A | | 11/1984 | Seyferth et al. | ............. 524/442 |
| 4,612,383 | A | | 9/1986 | Laine et al. | ................. 556/412 |
| 4,678,688 | A | | 7/1987 | Itoh et al. | .................... 427/387 |
| 4,689,252 | A | | 8/1987 | Lebrun et al. | .............. 427/228 |
| 4,774,312 | A | | 9/1988 | Burns | ........................ 528/33 |
| 4,869,858 | A | * | 9/1989 | Funayama et al. | ......... 264/103 |
| 4,929,704 | A | | 5/1990 | Schwark | ...................... 528/28 |
| 5,008,422 | A | * | 4/1991 | Blum et al. | ................. 556/402 |
| 5,021,533 | A | | 6/1991 | Schwark | ...................... 528/21 |
| 5,155,181 | A | | 10/1992 | Schwark | .................... 525/474 |
| 5,288,795 | A | | 2/1994 | Fujiki et al. | ................ 524/731 |
| 5,639,844 | A | * | 6/1997 | Blum et al. | ................. 521/154 |
| 5,824,280 | A | * | 10/1998 | Dahn et al. | ................. 423/325 |
| 5,919,572 | A | * | 7/1999 | Blum et al. | ................. 428/446 |
| 6,329,487 | B1 | * | 12/2001 | Abel et al. | .................... 528/21 |

* cited by examiner

Primary Examiner—Robert Dawson
Assistant Examiner—Jeffrey B. Robertson
(74) Attorney, Agent, or Firm—Howard M. Ellis

(57) ABSTRACT

Polysilazane/polysiloxane block copolymers particularly suitable for the preparation of durable, adherent silicon-containing coatings comprising polymeric segments of a polysilazane and polysiloxane are disclosed.

27 Claims, No Drawings

POLYSILAZANE/POLYSILOXANE BLOCK COPOLYMERS

TECHNICAL FIELD

This invention relates to block copolymers and more particularly to polysilazane/polysiloxane block copolymers and their preparation.

BACKGROUND OF THE INVENTION

The growth of the silicone industry since its beginnings can be attributed to the unique physical and chemical properties of the polysiloxanes. Silicone materials are now being used in almost all aspects of industrial processing and products, consumer goods and in many medical applications. Silicones are now used as paint and printing ink additives for flow control, leveling, pigment dispersion and gloss improvement, as plastics additives to improve flow, in textile processing applications to impart water Is repellency, oil resistance, and to provide a soft "finish", in cellular plastics as silicone-polyether copolymers to improve bubble formation and to provide for uniform cell size for polyurethanes and other foamable plastics, in consumer products such as furniture and car polish, iron spray, eyeglass lens paper, shaving lotion, hair care preparations, milk cartons, as antifoam agents in the food processing, wine fermentation, and chemical processing industries.

Many expanding technologies and major businesses are highly dependent on tailor-made products based on organo-silicon chemistry. For example, today's billion dollar urethane foam market was made possible by the development in the late 1950's of silicone surfactants. The development of silicone-coated release agents was critical to the success of pressure-sensitive adhesives. Silicone coatings provide long term weather and thermal protection for a variety of environmentally severe conditions on earth and in outer space.

Silicone resins have also been used as vehicles for heat resistant paints, and in recent years silicone-organic copolymers have been developed using alkyds, polyesters, epoxies and acrylics. Characterized by outstanding weathering gloss retention and heat resistance, these vehicles are widely used for coil coating and maintenance paints. In addition, frying and baking pans, release-type paper coatings, coatings for plastics and a large number of other end-uses have been commercialized by using silicones in combination with common organic coatings resins.

While such silicone-organic copolymers are now well known in the art, the combining of silicones and inorganic polymers such as polysilazanes to prepare copolymers is not as well known. U.S. Pat. No. 5,288,795, for instance, issued to H. Fujiki, discloses blending siloxanes with silazane surface-treated silica particulates. Coatings comprising random copolymers of siloxanes and silazanes are disclosed by U.S. Pat. No. 4,678,688 to Itoh, et al. These compositions are prepared by subjecting a mixture of monomeric chlorosilanes first to a base hydrolysis step to effect partial conversion of the chlorosilanes to siloxanes, and second to an ammonolysis step to effect conversion of the residual silicon-chlorine bonds to silazanes. A random siloxane/silazane copolymer is obtained because of the random nature of the hydrolysis/ammonolysis reactions which form the polymer. However, such random configurations of Si—O and Si—N bonds in a copolymer results in homogeneous compositions which exhibit a weighted average of the two families of materials.

While silazanes are noted for their excellent heat resistance, corrosion resistance, and adhesive properties, these attractive characteristics are compromised by their random copolymerization with silicones. Thus, as a rule, the random copolymerization of two families of materials results in properties which are a weighted average of the properties of each of the materials employed.

The above mentioned random copolymer may thus be effective in certain applications, but is unsatisfactory for providing the optimum in derivative performance based on the attractive features of each family of materials.

SUMMARY OF THE INVENTION

The present invention has an object to provide novel polysilazane/polysiloxane block copolymers which exhibit excellent heat resistance, corrosion resistance, and adhesion derived from their polysilazane blocks, as well as superior gloss, durability, oil and water resistance, and release characteristics derived from their polysiloxane blocks. Accordingly, block copolymers of the invention comprise at least one polysilazane with at least one polysiloxane. The polysilazane comprises a plurality of Si—N groups.

Another object of the present invention is to provide a block copolymer of a polysilazane and a polysiloxane which exhibits optimum benefits from each of the components, rather than an averaging of their properties.

Still another object of this invention is to prepare novel polysilazane/polysiloxane block copolymers where each block segment is at least 10 wt % of the copolymer weight.

It is a further object of this invention to prepare novel polysilazane/polysiloxane block copolymers that form attractive and durable protective coatings on metal, glass, and polymeric substrates.

Still yet another object of this invention is to prepare block copolymers which are not hampered by the comonomer reactivity ratio restriction found in random copolymers.

It is still another object of this invention to prepare novel block copolymers from a polysilazane and a different polymer having nucleophilic substituents. This would include a polysiloxane comprising at least one nucleophilic group. The nucleophilic group would preferably be a member selected from the group consisting of hydroxyl, an amine and mixtures thereof.

These and further objects are accomplished by the novel compositions of the present invention which comprise reaction mixtures comprising a polysilazane (A) and a polysiloxane (B) copolymerized to form a polysilazane/polysiloxane block copolymer. The sequential arrangement of the block copolymers of the present invention can vary from simple A-B structures containing only two segments, to A-B-A and B-A-B triblock structures, and multi-block systems possessing many segments -(A-B)-$_n$. Many intermediate arrangements can be made of the block copolymers of the present invention wherein the polymeric segments of the polysilazanes and polysiloxane are attached end to end and/or in branched configuration and/or graft configuration in which a plurality of siloxane chains are pendant to the silazane backbone, so that the physical and chemical characteristics of each of the separate sequences are asserted individually in the block copolymer.

Accordingly, for purposes of this invention the expression "block copolymer" as appearing in the specification and claims is intended to include both block copolymers and graft copolymer variations thereof.

Preferably, the block copolymers are prepared by copolymerizing a polysilazane with a polysiloxane. More particularly, polymer condensation techniques are utilized employing functional ended polysilazanes and polysiloxanes. As such, the separate polymer blocks are pre-formed under conditions affording the maximum degree of control over their compositions and then linking the blocks by standard methods of organic and organosilicon chemistry chosen to result in effectively quantitative conversion of the functional groups.

DESCRIPTION OF THE PREFERRED EMBODIMENTS

As described above, the polysilazane/polysiloxane block copolymers of this invention are made by copolymerizing at least one polysilazane with at least one polysiloxane.

The base ingredients in the inventive compositions include polysilazanes and polysiloxanes. Any polysilazane or a mixture of polysilazanes known in the art or commercially available, having repeating units of Si—N linkages, can be used to prepare the block copolymer. By "polysilazane" is meant any oligomeric or polymeric composition comprising a plurality of Si—N repeat units. By "oligomer" is meant any molecule or chemical compound which comprises several repeat units, generally from about 2 to 10 repeat units. "Polymer", as used herein, means a molecule or compound which comprises a large number of repeat units, generally greater than about 10 repeat units. The oligomeric or polymeric silazanes of this invention may be amorphous or crystalline in nature. Preferably, the polysilazane has at least one amine group, and more preferably, at least two terminal and primary amine groups as part of its composition, although the presence of at least one Si—N group within the molecule suffices to provide the reactivity essential to the preparation of the novel block copolymer compositions of the present invention.

Representative examples of various polysilazanes that can be used include, but are not limited to, polymers described in U.S. Pat. No. 4,482,669 entitled "Preceramic Organosilazane Polymers" issued to Seyferth et al; U.S. Pat. No. 4,774,312 entitled "Polydisilacyclobutasilazanes" issued to Burn; U.S. Pat. No. 4,689,252 entitled "Polysilazane Compositions which can Crosslink in the Presence of a Metal Compound Catalyzing a Hydrosilylation Reaction" which issued to Laine et al; U.S. Pat. No. 4,612,383 entitled "Method of Producing Polysilazanes" issued to King et al; U.S. Pat. No. 5,155,181 entitled "Thioamide-Modified Silazane Polymer Composition Containing a Free Radical Generator" issued to Schwark; U.S. Pat. No. 4,929,704 entitled "Isocyanate and Isocyanate-Modified Polysilazane Ceramic Precursors" issued to Schwark; and U.S. Pat. No. 5,021,533 entitled "Crosslinkable Poly(thio)ureasilazane Composition Containing a Free Radical Generator. The entire disclosure of these U.S. Patents and the references contained in these patents are specifically incorporated herein by reference.

In the alternative, and preferably, novel polysilazane may be prepared according to the methods set forth in U.S. Pat. No, 6,329,487, filed Nov. 12, 1999, the contents of which are incorporated herein-by-reference.

The above polysilazanes are characterized by repeating units of silicon-nitrogen linkages and comprise a reduced amount of Si—H bonds relative to the quantity of Si—H bonds found in the halosilanes used to prepare the novel polysilazanes. The term halosilanes is meant to include organohalosilanes.

The novel polysilazanes are prepared by reacting a halosilane, that must have at least one Si—H bond, with anhydrous liquid ammonia, where the halosilane has the general formula:

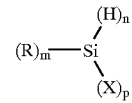

where m is 0 to 2, n is 1 to 3, p is 1 to 3, and m+n+p=4, where H is hydrogen, where R may be identical or different and includes a substituted or unsubstituted alkyl group, a substituted or unsubstituted cycloalkyl group, a substituted or unsubstituted alkenyl group and a substituted or unsubstituted aryl group; and where X is selected from bromine, chlorine, fluorine or iodine. Preferably, if m is 2, each R is the same, and, if p is 2 or 3, each X is the same, as those silanes are more readily available and easier to make. Preferably, R is methyl or ethyl, X is preferably chlorine, m is preferably 1, n is preferably 1, and p is preferably 2. Examples of suitable halosilanes and organohalo-silanes include, but are not limited to, dichlorosilane, methyldichlorosilane, dimethylchlorosilane, diethylchlorosilane, ethyl dichlorosilane, ethyldibromosilane, ethyldiiodosilane, ethyl difluorosilane, dichloromonofluorosilane, propyldibromosilane, isopropyldichlorosilane, butyldiiodosilane, n-propyldichlorosilane, dipropylchlorosilane, trichlorosilane, n-butyldichlorosilane, isobutyldichlorosilane, isoamyldichlorosilane, benzyldichloro-silane, naphtyldichlorosilane, propenyldichlorosilane, phenyldi-chlorosilane, diphenylchlorosilane, methylethylchlorosilane, vinylmethylchlorosilane, phenylmethylchlorosilane, dibenzylchlorosilane, p-chlorophenylsilicondichloride, n-hexyldichlorosilane, cyclohexyl-dichlorosilane, dicyclohexylchlorosilane, diisobutylchlorosilane, paratolyldichlorosilane, diparatolylchlorosilane, parastyryldi-chlorosilane, ethynyldichlorosilane and mixtures thereof.

The preferred organohalosilanes are methyldichlorosilane and phenylchlorosilane as they are commercially available and work well.

Mixtures of halosilanes are also useful in preparing the polysilazane because the organic groups attached to silicon can often impart a variety of chemical and/or physical characteristics of use to the polymer. For instance, organic residues of high hydrocarbon content can assist in hydrocarbon solvent solubility, as well as confer a greater degree of hydrolytic stability to the polysilazane.

In order to confer some of the desirable characteristics certain organic residues can impart to the polysilazane, the halosilane of the above general formula can be mixed with up to about 90 wt % of a halosilane that does not contain an Si—H bond before the preparation of the polysilazane via ammonolysis in anhydrous liquid ammonia. Preferably, the halosilane of the above general formula is mixed with the halosilane that does not contain an Si—H bond prior to ammonolysis for the sake of simplicity. A few representative examples of silanes lacking an Si—H bond are dimethyldichlorosilane, vinylmethyldichlorosilane, diphenyldi-chlorosilane, phenylmethyldichlorosilane, and the like.

The novel polysilazane compounds of U.S. application Ser. No. 09/439,871 in the preferred embodiment described above are prepared by ammonolysis, the method comprising the following steps:

a) introducing at least one halosilane having at least one Si—H bond into liquid anhydrous ammonia wherein any formed ammonium halide salt is solubilized and provides an acidic environment therein; and b) maintaining the formed silazanes in the acidic environment for further polymerization thereby reducing the number of Si—H bonds that initially were present in the starting halosilane.

No additional catalyst agent is required other than the ammonium halide produced in-situ.

The selected halosilane or mixtures thereof are introduced at directly into and reacted with anhydrous liquid ammonia. Normally during ammonolysis, on a strictly stoichiometric basis, two molecules of ammonia are needed for each halogen atom substituted on a halosilane. One ammonia molecule replaces the halogen atom while the second molecule of ammonia forms an ammonium halide salt. In this regard, it has been found that it is advantageous to introduce the halosilanes into a closable reaction vessel which is already charged with an excess of anhydrous liquid ammonia, preferably, at least twice the amount of ammonia as X halogen in the monomer mixture, and more preferably, at least five times the amount of ammonia as X in the monomer mixture.

The anhydrous liquid ammonia is maintained at a sufficient temperature and/or pressure to remain in a liquefied state and preferably, between about −33° C. to about 130° C. As a result, the anhydrous ammonia, in a liquefied state, acts as a reactive solvent that not only participates as a nucleophile in the nucleophilic attack on the halosilane, but also solubilizes and retains a substantial amount of ammonium halide salt produced during ammonolysis.

While not wishing to be bound by any particular theory of operation, it is believed that by retaining the solubilized and ionized ammonium halide in the liquid ammonia solution, the ionized salt acts as an effective catalyst in polymerization process to produce novel polysilazanes which are depleted in Si—H content from their original composition without the use of added metallic or other catalysts.

It has been observed that initially the reaction proceeds in a homogenous phase wherein the generated ammonium halide salt is solubilized and ionized in the anhydrous liquid ammonia solution of silane ammonolysis product, thereby reducing precipitation of ammonium halide salt and allowing the solubilized salt to act in catalytic fashion to polymerize the halosilane ammonolysis products. This process is accompanied by a reduction in Si—H bonds in the product relative to the number present in the halosilane reactants and ammonolysis products. Once formed, the polysilazane product having reduced Si—H content is then found to spontaneously separate from the liquid ammonia phase. In this new phase layer it is essentially free from ammonium chloride salt contamination. As such, solubilization of ammonium chloride avoids contamination of the ammonolysis products with precipitated salt. The process described above also eliminates the need for introducing an inert solvent to reduce the viscosity of the reaction mixture, as described in prior art. A distinct disadvantage of adding such inert solvent is the problem of dealing with the large evolution of heat which accompanies the crystallization of the ammonium chloride from the reaction mixture. This problem is circumvented in the process described above, since the ammonium chloride remains in solution in the presence of excess liquid ammonia.

The mechanism for further polymerization of silazanes formed during the ammonolysis process where there is a reduction in the number of Si—H bonds present in the initial ammonolysis products is not yet completely understood. Unexpectedly, further polymerization through ammonolysis can be effected without active silicon-halogen ammonolysis sites on a starting compound which has at least one Si—H bond. It is believed that heterolytic cleavage of the Si—H bond provides a route for further ammonolysis until all active Si—H sites are cleaved and reacted and/or the preferred viscosity is achieved.

The polysilazanes of U.S. Pat. No. 6,329,487 preferred for use in the present invention are characterized by a decreased number of Si—H bonds relative to the amount of Si—H bonds contained in the starting compounds. The reduction in Si—H bonds can range from about 10% to about 90% relative to the number of Si—H bonds contained in the starting compounds. Additionally, it has been found there is a proportional increase in the Si—N linkages which is essentially proportional to the reduction in Si—H bonds. These novel polysilazanes are believed to comprise several different structures including linear, branched, ladder, and fused ring morphologies, although it is believed that these novel polysilazanes have fewer isolated ring structures than prior art polysilazanes.

Representative examples of a polysilazane having fused six and eight membered rings are shown in structures (1) and (2)below. These structures are merely representative of the polysilazanes wherein R may be identical or different, and selected from the group including a hydrogen atom, a substituted or unsubstituted alkyl group, or substituted or unsubstituted cycloalkyl group, a substituted or unsubstituted alkenyl group or a substituted or unsubstituted aryl group and n is 1 or greater.

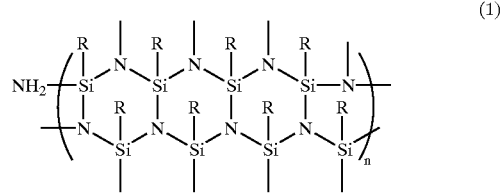

(1)

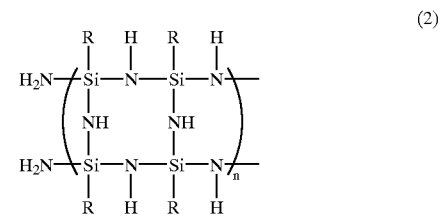

(2)

While not wishing to be bound by theory, it is believed that the initial reaction leading to the formation of these novel ammonolysis products may be represented generally by the following Scheme I showing a possible mechanistic route using a Si—H bond containing starting compound such as methyldichlorosilane:

Scheme (I)

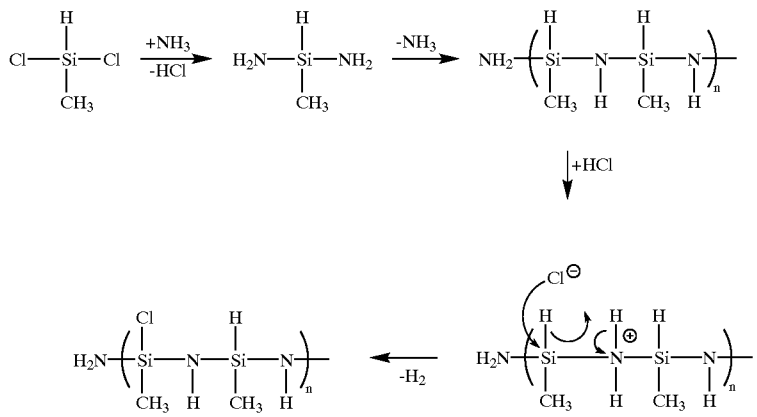

During the initial ammonolysis, the silicon-chlorine bonds undergo ammonolysis generating a diaminosilane which is further converted into a linear molecule containing several Si—N repeat units. The linear structure is stabilized in the anhydrous liquid ammonia containing an ionized ammonium halide salt dissolved therein. This ionized and dissolved ammonium halide salt then acts as an acid catalyst which catalyzes a loss of a Si—H bond to generate a new silicon-chlorine bond on the straight chain of the polymer. The newly generated chlorosilane bond may then undergo further ammonolysis. This reaction will proceed until virtually all chlorosilicon bonds are ammonolyized.

Additional crosslinking occurs when halide replaces silicon-bonded hydrogens on the polymer and, in turn, that halide substituent undergoes further ammonolysis with other polymer chains. This is observed to result in a decrease in Si—H bonds and an increase in Si—N linkages. The number of Si—H bonds will decrease by about 10% to about 90%, while the number of Si—N bonds will be observed to increase by about the same amount. A longer reaction time and a greater Si—H bond content in the initial halosilane reactant results, ultimately, in a higher molecular weight for the polysilazane product.

The polymerization can be performed in the same reactor and at the same conditions used for ammonolysis and without isolation of the initial silazane ammonolysis product. Thus, ammonolysis, polymerization, and crosslinking may all be occurring at the same time. Two easily-separated phases are formed and the novel polysilazane can be easily isolated in a relatively pure state by filtering and washing with either additional liquid ammonia, or a simple hydrocarbon solvent such as hexane or heptane.

The polysilazane blocks, either from the prior art or from those disclosed in copending U.S. Pat. No. 6,329,487, may be oligomeric or polymeric in nature, cyclic, linear, or cyclolinear in structure, and either liquid or solid in form. Each polysilazane should preferably contain at least 4 repeating units, and more preferably should contain about 6 to greater than about 20 repeating units. The polysilazane blocks may contain at least two amine groups through which they can polymerize with functional groups, such as hydroxyl groups of the polysiloxane blocks, although the presence of at least one Si—N bond within the polysilazane would suffice to promote such reactivity when a reactive, nucleophilic group is used to promote the copolymerization of the polysilazane and polysiloxane blocks used in the preparation of the novel block copolymers of the present invention. The reaction of an Si—OH group with an Si—NRH group (wherein R=hydrogen, alkyl, substituted alkyl, cycloalkyl, or a silicon-based radical, and preferably a silazane radical comprising a terminal Si—NH$_2$ group) results in the formation of an Si—O—Si bond scheme with the evolution of ammonia, an amine, or a silicon based radical comprising a terminal Si—NH$_2$ group. The Si—NH$_2$ group which results from the reaction of an Si—OH group with a Si—NRH group with a SiNRH group wherein R=a silicon-based radical and preferably a silazane radical, can subsequently react with an additional Si—OH group to form an Si—O—Si group and a molecule of ammonia, as described above. Thus, in a preferred embodiment of the present invention, polysilazanes are reacted with OH functional polysiloxanes to prepare block copolymers in which the blocks of polysilazane and polysiloxane are joined by Si—O—Si bond linkages.

Although the above description illustrates the reactivity of Si—OH group with a polysilazane, a variety of other nucleophilic groups may be used to prepare the block copolymers of the present invention. Thus, the polysiloxane used in the practice of the present invention may comprise such nucleophilic groups as —OH, —NH$_2$, —NRH, —CO$_2$H, —SH, and others to effect the desired covalent linkages between the polysilazane blocks and the polysiloxane blocks of the novel block copolymers of the present invention. While this group is representative of the types of nucleophilic moieties which can react with Si—N bonds in the polysilazanes used in the practice of this invention, it is not meant to be limiting. Indeed, any nucleophilic group which can cleave the Si—N bond can be used to prepare these novel compositions. The nucleophilic group may be bonded directly to silicon, or may be present at the terminus of a "spacer" group which is bonded to silicon. Thus, a polysiloxane which is terminated with an aminopropylsilyl group is also suitable for the practice of this invention:

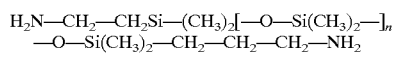

The polysilazane blocks are copolymerized with any polysiloxane or mixtures of different polysiloxanes that are commercially available or can be prepared by methods well-known in the art. The polysiloxane may contain a linear, branched or cross-linked polymeric system of alternating silicon and oxygen atoms having the general formulas:

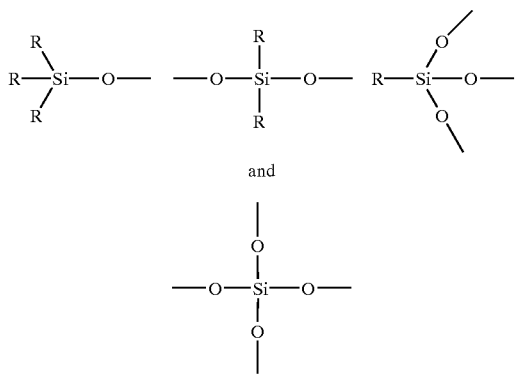

and where R may be the same or different and includes, but is not is limited to hydrogen, a substituted or unsubstituted alkyl group, a substituted or unsubstituted cycloalkyl group, a substituted or unsubstituted alkenyl group and a substituted or unsubstituted aryl group, and the like. Representative examples include 3-methylcyclohexyl, 2-ethyl cyclopentyl, 2-methyl, 3-butenyl, norbornenyl,p-chlorophenyl,p-methylphenyl, methoxyphenyl, dimethyl-phenyl, and so on.

To prepare an A-B block copolymer only one nucleophilic group needs to be present in the polysiloxane, although two or more reactive nucleophilic functional groups are preferred. Representative examples include hydroxyl groups, amine groups, acid groups and thiol groups. Most preferably, polysiloxanes contain hydroxyl groups. It is believed that a polysiloxane polymer having at least one, and more preferably, more nucleophilic substituents acting as reactive groups attack the Si—NH$_2$ or Si—NH—Si bonds of the polysilazane, as described above resulting in the breaking of these bonds and the formation of new bonds. The polysiloxane should contain at least 4 repeating units; preferably the polysiloxane contains about 6 to greater than about 20 repeating units to maximize the advantageous properties of each segment in the block copolymer. The ratio of the number of repeating units in the polysilazane to the number of repeating units in the polysiloxane is preferably about 1:4 to about 4:1.

The polysilazane/polysiloxane block copolymer can be prepared by polymerizing the polysilazane with the polysiloxane. The weight ratio of the polysilazane to the polysiloxane should be about 15:85 to about 85:15 as at ratios above or below these full copolymerization of the blocks is often not effected; the preferred polysilazane/polysiloxane weight ratio is about 20:80 to about 80:20. At least about 90 wt % of the copolymer should be made from polysilazane and polysiloxane blocks that are each at least 10 wt % of the copolymer. When —OH or —NH$_2$ functional polysiloxanes are used to prepare the novel block copolymers of the present invention, no catalyst is required. Also, no solvent is required during polymerization, but a solvent can be added to reduce viscosity, if desired.

While reactions of the invention can be performed at temperatures approximating room temperature, or even below, more economically attractive rates of reaction can be achieved by heating reaction mixtures to at least 45° C., and more preferably, from about 65° to about 100° C. The reaction typically requires from about one to about two hours. The reaction is complete when off gassing ceases. While the copolymer will flow freely without added solvent, the viscosity can be reduced if desired by the addition of an aromatic hydrocarbon solvent such as toluene, xylene, an aliphatic hydrocarbon solvent such as heptane, decane, or dodecane, an ether solvent such as tetrahydrofuran or anisole, an ester solvent such as hexyl acetate or butyl propionate, or a ketone solvent such as acetone, methylethylketone, and the like.

The resulting polysilazane/polysiloxane block copolymer can be used in a variety of applications, including paint and printing ink additives, plastics additives, textiles, cellular plastics, consumer products, and antifoam agents. An example of an especially useful application of the novel block copolymers is as release agents. To use the copolymer as a release agent, it can be applied to a metal, glass, polymer, or other surface by forming a dilute solution generally in the range from about 1 to about 10 percent by-weight, and preferably from about 1 to about 5 percent by-weight, and more specifically in the range of 2 to about 3 percent by-weight in a suitable solvent. Representative suitable examples include, for instance, hydrocarbon solvents, such as hexane, heptane, toluene, napthas and terpenes, ketones like acetone and methyl ethyl ketone, esters, such as methyl acetate and dimethyl adipate, as well as volatile cyclic siloxanes and volatile, low molecular weight linear siloxanes. The solutions can be spread on a surface, and letting the solvent evaporate. It can also be applied by spray, dip, or any other suitable coating technique known in the art. Such compositions form extremely durable coatings on the substrate through adhesion through their polysilazane segments, but they also derive good release characteristics from their polysiloxane segments.

The following examples further illustrate this invention.

EXAMPLE 1

In order to demonstrate the preparation of the polysilazane/polysiloxane block copolymers of the invention, the following experiment was performed:

Part A

In preparing the block copolymer, the polysilazane selected had the designation Kion™ ML66 which is copolymer prepared from a mixture of halosilanes. It is commercially available from the Kion Corporation, 150 East 58th Street, Suite 3238, New York, N.Y. 10155.

The polysiloxane selected for this block copolymer had the designation Silicone Elastomer 80N, a high molecular weight, high viscosity, hydroxy-terminated polysiloxane, commercially available from Wacker Silicones Corporation, 3301 Sutton Road, Adrian, Mich. 49221.

The first sample was prepared by placing in a 250 ml single neck round bottom flask equipped with a magnetic stir bar and gas outlet valve attached to an oil bubbler, 100 g of the Kion ML66 polysilazane and 15.23 g of the Silicone Elastomer 80N polysiloxane. With the magnetic stirrer operating the mixture was heated in a water bath to 65° C. The reaction that generates the block copolymer was accompanied by off-gassing. The reaction was complete after about 2 hours when no further gas was observed to evolve. The block copolymer formed appeared as a clear, pale yellow, free-flowing viscous liquid.

Part B

A second block copolymer of the invention was prepared using the same laboratory set-up as in Part A, above by reacting 100 g of the Kion ML66 and 15.83 g of Silicon Elastomer 20N, a lower viscosity hydroxy terminated polysiloxane than that used in Part A above. The procedure for preparing the sample including reaction temperature corresponded to Part A. After 2 hours, the block copolymer formed appeared as a clear, pale yellow, free flowing viscous liquid of lower viscosity than the copolymer prepared in Part A.

EXAMPLE 2

To demonstrate differences in the properties of copolymers prepared by random hydrolysis method relative to copolymers prepared by the block copolymerization of the present invention, the following experiment was performed.

A 500 ml round bottom single neck with magnetic stirrer and gas outlet valve was charged with 54.25 g of Ceraset™ SN, a polyureasilazane copolymer, available from Kion Corporation, 150 East 58th Street, Suite 3238, New York, N.Y. 10155. 6.03 g of deionized water was added. The mixture was stirred magnetically for three days. As the mixture reacted gas evolved as evident in the oil bubbler. The sample was slowly heated in a water bath to 95° C. with additional gas evolution. As the material was heated, it became increasingly viscous until it turned into a firm gel that would not flow.

When a copolymer is prepared by random hydrolysis according to this experiment the resulting copolymer material becomes a non-flowing mass, as compared to block co-polymerizations of Example 1, where the resulting block copolymers were flowing liquids.

It is believed the addition of water resulted in random hydrolysis of the Si—N bonds in the preformed polysilazane to generate new Si—O bonds. Thus, a copolymer comprising random Si—N and Si—O bond configurations in the composition resulted. This is in contrast to the block copolymers of Example 1 where a preformed polymer segment (polysiloxane) comprising a series of sequential Si—O bonds was inserted into a polymer chain comprising a series of sequential Si—N bonds (polysilazane). While the Si—N bonds of Example 1 are susceptible to nucleophilic attack by an Si—OH group, the Si—O bond is not susceptible to reaction with Si—N bonds. Therefore, the polymer generated in Example 1 retains long chains of Si—O—Si—O repeat units. Only the terminal Si—OH groups of the polysiloxane react with the Si—N bonds of the polysilazane to make new Si—O bonds in the block copolymer.

EXAMPLE 3

A series of polysilazane/polysiloxane block copolymers were prepared to demonstrate how effective they were when used as mold release agents.

Following the procedure of Example 1, Part A, Kion ML66 polysilazane was mixed and heated with various amounts of Silicon Fluid F1006, a low viscosity, low molecular weight hydroxy-terminated polysiloxane commercially available from Wacker Silicones Corp, Adrian, Mich., in proportions according to Table 1, below:

TABLE 1

| Kion™ ML66 (in grams) | F1006 (percent of total solution) | F1006 (in grams) |
|---|---|---|
| 25 | 10 | 2.8 |
| 25 | 20 | 10.7 |
| 25 | 30 | 16.7 |
| 25 | 40 | 25.0 |
| 25 | 50 | 37.5 |

To test the effectiveness of the resulting block copolymers when used as mold release agents, three coats of each of the compositions given in Table 1 were applied to a polyester mold surface. Between each coating a 15 minute air cure was allowed at room temperature. When the coating was set, a vinyl ester resin (Reichhold, ATLAC 580-05) was molded against the treated surfaces. As a control, the vinyl ester resin was applied to the polyester mold surface without the use of a mold release. The best mold release characteristics were obtained using the 30 percent F1006 sample, although excellent mold release behavior was observed for all of the compositions. The vinyl ester resin would not release from the untreated control polyester mold surface.

EXAMPLE 4

To demonstrate the optical properties of the polysilazane/polysiloxane block copolymers of this invention, the following experiment was performed:

Using the apparatus and following the protocols of Example 1, Part A, 25 g of Kion ML66 polysilazane was reacted with 37.5 g of Wacker Silicone Corporation's hydroxy-terminated Silicone Elastomer 20N by heating the mixture at 95° C. for two hours in a water bath. The block copolymer formed was a clear, pale yellow, free flowing viscous liquid.

This polysilazane/polysiloxane block copolymer reaction product was then used to prepare a 10% wt solution of the block copolymer in a hydrocarbon solvent (Tolu-sol AHT, Shell Chemical Company). The polysilazane/polysiloxane block copolymer solution was then wiped onto the surface of a shiny brass plate that had been degreased using mineral spirits and isopropanol. After ten minutes a clear, glossy, adherent, decorative and colorless coating developed on the plate surface. The coated brass plate could not be visually discriminated from a polished, but uncoated brass plate.

EXAMPLE 5

To demonstrate the corrosion inhibiting properties of the polysilazane/polysiloxane block copolymers of this invention, the following experiment was performed:

Using the apparatus of Example 2, 367.5 g of Kion ML66 polysilazane was introduced into the 500 ml flask with 189.3 g of Wacker Silicone Corporation's hydroxy-terminated Silicon Fluid F1006. While stirring, this mixture was heated in a water bath to 105° C. for two hours. The reaction generated the block copolymer with off gassing. The reaction was complete when no further off gas was observed. The block copolymer had the appearance of a clear, pale yellow free flowing viscous liquid.

A 3 weight percent solution of the block copolymer in a hydrocarbon solvent (Isopar G, Exxon Mobil Chemical Company) was prepared and coated by wiping onto several shiny aluminum plates. After 10 minutes at room temperature a clear, colorless coating developed on each plate. The aluminum plates were then immersed into separate 200 ml solutions of tap water; ammonium chloride; sodium chloride and sodium hydroxide. The condition of the plates was visually evaluated after 72 hours of exposure to the above solutions. The results are summarized in Table 2 below.

TABLE 2

| PLATE | TAP WATER | $NH_4Cl$ – 0.22 g per 200 ml | NaCl – 0.22 g per 200 ml | NaOH – 0.23 g per 200 ml |
|---|---|---|---|---|
| UNCOATED SURFACE | discoloration | discoloration | mild discoloration | discoloration, severe corrosion with large black spots |

TABLE 2-continued

| PLATE | TAP WATER | NH₄Cl – 0.22 g per 200 ml | NaCl – 0.22 g per 200 ml | NaOH – 0.23 g per 200 ml |
| --- | --- | --- | --- | --- |
| COATED SURFACE | no discoloration | one small corroded spot, possibly due to imperfect coating | no discoloration | etched, but uniformly pitted and grey colored surface, not unattractive |

EXAMPLE 6

To demonstrate the oxidation protection conferred upon an article when it is coated with the adherent polysilazane/polysiloxane block polymer of this invention, the following experiment was performed:

One half of a shiny brass plate was coated using the polysilazane/polysiloxane block copolymer described in Example 4. The other half was left untreated. After the solvent had evaporated from the treated half, both halves of the brass plate were heated to red heat for a period of three minutes in the direct flame of a methylacetylene/propadiene torch.

The coated portion of the brass plate was visually unchanged, while the untreated half of the brass plate tarnished, leaving a dull, blackened finish. The results of this experiment demonstrate that a coating of polysilazane/polysiloxane block copolymer provides a coating which is thermally stable, flame-resistant and resistant to oxidation.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

We claim:

1. A polysilazane/polysiloxane block copolymer comprising at least one polysilazane block and at least one polysiloxane block.

2. The block copolymer of claim 1 wherein the ratio of the number of repeating units in said polysilazane block to the number of repeating units in said polysiloxane block is from about 1:4 to about 4:1.

3. A polysilazane/polysiloxane block copolymer comprising at least one polysilazane and at least one polysiloxane wherein said polysilazane is a copolymer.

4. The block copolymer of claim 1 wherein the polysilazane block is prepared from a silazane polymer made by reacting a halosilane or a mixture of halosilanes with ammonia, an amine, or mixtures thereof, wherein at least one halosilane comprises at least one Si—H bond.

5. A polysilazane/polysiloxane block copolymer comprising at least one polysilazane and at least one polysiloxane, said polysilazane prepared from a halosilane or a mixture of halosilanes reacted with anhydrous liquid ammonia, at least one halosilane is a compound of the general formula:

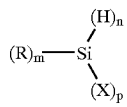

where H is hydrogen, each R is independently selected from substituted or unsubstituted alkyl, substituted or unsubstituted cycloalkyl, substituted or unsubstituted alkenyl, and substituted or unsubstituted aryl, each X is independently selected from chlorine, iodine, fluorine and bromine, m is 0 to 2, n is 1 to 3, p is 1 to 3, and m×n×p=4.

6. A method for making a polysilazane/polysiloxafle block copolymer comprising at least a step of reacting a polysilazane with a polysiloxane.

7. The method according to claim 6 wherein said reaction is effected by using a polysiloxane having at least one nucleophilic substituent.

8. The method according to claim 7 wherein said nucleophilic substituent is selected from the group consisting of hydroxyl, amine and mixtures thereof.

9. The method according to claim 6 wherein said polysiloxane comprises structural units selected from the group consisting of

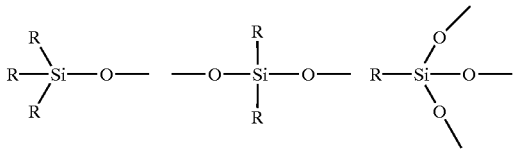

and

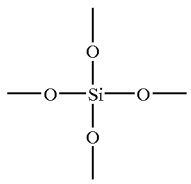

wherein R is independently selected from hydrogen, substituted or unsubstituted alkyl, subsLituted or unsubstituted cycloalkyl, substituted or unsubstituted alkenyl and substituted or unsubstituted aryl.

10. The method according to claim 6 wherein said polysilazane is prepared by reacting a halosilane or mixture of halosilanes and anhydrous liquid ammonia wherein at least one halosilane is a compound having the general formula:

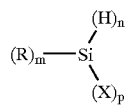

where H is hydrogen, each R is independently selected from substituted or unsubstituted alkyl, substituted or unsubstituted cycloalkyl, substituted or unsubstituted alkenyl, and substituted or unsubstituted aryl, each X is independently selected from chlorine, iodine, fluorine and bromine, m is 0 to 2, n is 1 to 3, p is 1 to 3, and m+n+p=4.

11. The method according to claim 10 wherein R is methyl.

12. The method according to claim 10 wherein X is chlorine.

13. The method according to claim 10 wherein the reaction is conducted with at least 2 times the amount of anhydrous liquid ammonia based on the total equivalents of X in the monomer mixture.

14. The method according to claim 6 wherein the weight ratio of said polysilazane to said polysiloxane is about 20:80 to about 80:20.

15. The method according to claim 6 wherein no solvent is used during said reaction.

16. The method according to claim 6 wherein the ratio of the number of repeating units in the polysilazane to the number of repeating units in the polysiloxane is about 1:4 to 4:1.

17. The method according to claim 6 wherein said polysilazane comprises linear segments.

18. A polysilazane/polysiloxane block copolymer made according to the method of claim 6.

19. A method for preventing substances from adhering to a surface comprising at least the step of coating said surface with the polysilazane/polysiloxane block copolymer of claim 1.

20. The method according to claim 6 wherein said polysilazane of said polysilazane/polysiloxane block copolymer is prepared by the step of at least polymerizing a halosilane or a mixture of halosilanes in the presence of anhydrous liquid ammonia wherein at least one halosilane comprises at least one Si—H bond.

21. A surface coated with the polysilazane/polysiloxane block copolymer of claim 1.

22. A method of making a polysilazane/polysiloxane block copolymer comprising the steps of:
(i) preparing a polysilazane from a halosilane or mixture of halosilane monomers by polymerizing in the presence of from at least about 5 equivalents of anhydrous liquid ammonia based on the total equivalents of X in the monomer mixture, wherein at least one halosilane monomer is a compound of the general formula:

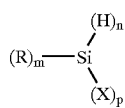

where R is methyl or ethyl, X is chlorine, m is 1 or 2, n is 1 or 2, p is 1 or 2, and m+n+p=4; and
(ii) reacting said polysilazane with about a 25% to a 400% molar amount of the polysiloxane.

23. The polysilazane/polysiloxane block copolymer made according to the method of claim 22.

24. A surface coated with the polysilazane/polysiloxane block copolymer of claim 23.

25. A method of making a polysilazane/polysiloxane block copolymer comprising the steps of:
(i) preparing a polysilazane from a halosilane or mixture of halosilane monomers by polymerizing in the presence of from about 5 to about 10 equivalents of anhydrous liquid ammonia wherein at least one halosilane monomer is a compound of the general formula:

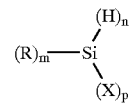

where R is methyl or ethyl, X is chlorine, and m is 1 or 2, n is 1 or 2, p is 1 or 2, and m+n+p=4; and
(ii) reacting said polysilazane with about a 25% to a 400% molar amount of polysiloxane at a temperature of about 250 to about 200° C., wherein said polysiloxane comprises structural units selected the group consisting of:

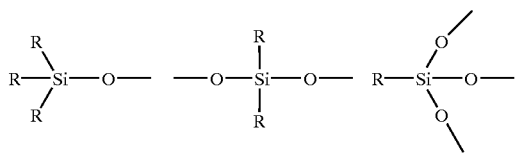

and

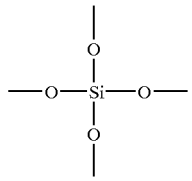

wherein R is independently selected from hydrogen, substituted or unsubstituted alkyl, substituted or unsubstituted cycloalkyl, substituted or unsubstituted alkenyl and substituted or unsubstituted aryl.

26. A polysilazane/polysiloxane block copolymer made according to the method of claim 25.

27. A surface coated with the polysilazane/polysiloxane block copolymer of claim 5.

* * * * *

UNITED STATES PATENT AND TRADEMARK OFFICE
CERTIFICATE OF CORRECTION

PATENT NO. : 6,534,184 B2
APPLICATION NO. : 09/793224
DATED : March 18, 2003
INVENTOR(S) : Gary J. Knasiak et al.

It is certified that error appears in the above-identified patent and that said Letters Patent is hereby corrected as shown below:

Column 14, line 4, replace "m x n x p=4" with -- m + n + p = 4 --

Column 14, line 5, replace "polysilazane/polysiloxafle" with -- polysilazane/polysiloxane --

Column 14, line 33, replace "subsLituted" with -- substituted --

Column 16, line 14, replace "250 to about 200 ° C" with -- 25° to about 200° C --

Signed and Sealed this

Twenty-fourth Day of October, 2006

JON W. DUDAS
*Director of the United States Patent and Trademark Office*